United States Patent Office
3,048,600
Patented Aug. 7, 1962

3,048,600
ETHERS AND ESTERS OF 2-METHYLNAPHTHA-
LENE AS RESIN PLASTICIZERS
John J. Jaruzelski, Pittsburgh, Pa., assignor to United
States Steel Corporation, a corporation of New Jersey
No Drawing. Filed Sept. 15, 1959, Ser. No. 840,002
4 Claims. (Cl. 260—348)

This invention relates to methylnaphthalene derivatives useful as resin plasticizers, especially for polyvinyl chloride resins.

Certain synthetic resins such as polyvinyl chloride require the addition of plasticizers to facilitate molding or other applications thereof. I have discovered certain novel derivatives of methylnaphthalene which may be produced without difficulty by a method of my invention, and will serve as well for plasticizing resins as other compounds previously employed, such as dioctyl phthalate and dioctyl sebacate. The compounds which I have discovered are lower acyloxymethylalkylnaphthalenes and alkoxymethylalkylnaphthalenes. These compounds are compatible with polyvinyl-chloride resins and upon curing, give elastomeric products with excellent strength properties. As a preliminary to the production of the methylnaphthalene derivatives I first make from methylnaphthalene a halomethylalkylnaphthalene and then convert the latter, e.g., 1-chloromethyl-2-methylnaphthalene, to an ester or ether by suitable reagents.

The novel compounds of my invention have the following general structural formula:

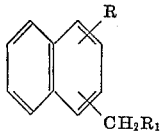

where R is an alkyl group with 1 to 12 carbon atoms and $R_1$ is an acyloxy or alkoxy group $$(R\overset{O}{\underset{\|}{C}}-O-,\ RO-,\ RO(CH_2)_2O-\ or\ RO(CH_2)_2O(CH_2)_2O-)$$

including from 1 to 18 carbon atoms. I produce the compounds by the reaction:

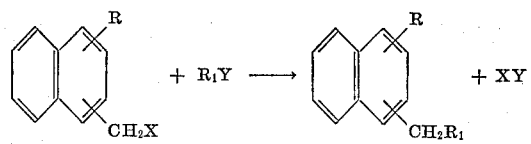

where X is a halogen such as chlorine, bromine or iodine and Y is hydrogen or an alkali metal such as sodium or potassium. The preferred halogen is chlorine because of its low cost.

A complete understanding of the invention may be obtained from the following detailed explanation of the manufacture of several typical examples.

As the starting material for any of the several compounds, a halomethylalkylnaphthalene was made from methylnaphthalene by the following procedure:

2-methylnaphthalene (639 grams, 4.5 moles) was dissolved in ligroin (700 grams, B.P. 100 to 110° C.) and placed in a 5000 ml. flask containing 650 grams of concentrated hydrochloric acid. To this mixture 225 grams (7.5 moles) of paraformaldehyde was added, the mixture was agitated and heated to between 80 and 90° C. with a stream of dry hydrogen chloride being passed through. After eight hours the reaction was discontinued and the mixture permitted to cool. On separation of the layers, the organic layer was washed and distilled. The product was collected at 133 to 142° C. under 3.0 mm. Hg absolute pressure and amounted to 520 grams 1-chloromethyl-2-methylnaphthalene (61% yield, M.P. 62 to 64° C.).

When a mixed 1- and 2-methylnaphthalene was substituted for 2-methylnaphthalene, a liquid product boiling at 131 to 147° C. under 3.0 mm. pressure was obtained in yields up to 75%.

Chloromethylmethylnaphthalenes prepared according to the above description were used for the synthesis of the novel plasticizer compounds as explained in detail herebelow.

*Example I.—2-Methylnaphthylmethyl Butyrate (MNMB)*

A suspension of sodium butyrate (33.0 grams, .30 mole) in 150 ml. of N,N-dimethylformamide was treated with 1-chloromethyl-2-methylnaphthalene (50.0 grams, .262 mole) and heated to between 145 and 150° C. with agitation for 10½ hours. The following reaction resulted.

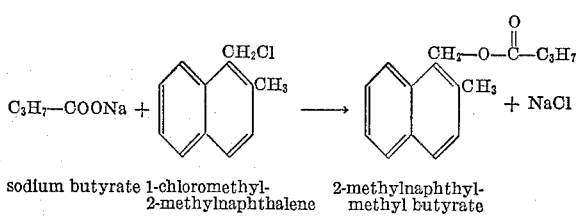

sodium butyrate    1-chloromethyl-2-methylnaphthalene    2-methylnaphthylmethyl butyrate The reaction mixture was filtered and distilled under vacuum. The desired 2-methylnaphthylmethyl butyrate (MNMB) distilled at 150 to 158° C. under 1.9 mm. Hg absolute pressure and the yield amounted to 55.0 grams (86% yield). The compound had a refractive index of 1.5694 at 25.3° C. Its composition was: C, 78.3%; H, 7.6% compared to C, 79.3 and H, 7.4, calculated for $C_{16}H_{18}O_2$.

*Example II.—x-methylnaphthyl-(1 or 2)-methyl pelargonate*

Using the procedure described in Example I, sodium pelargonate (492 grams) was treated with x-chloromethyl-(1 or 2)-methylnaphthalene, giving 730 grams (82% yield) of the desired x-methylnaphthyl-(1 or 2) methyl pelargonate. The product distilled at 170 to 185° C. under .4 mm. Hg absolute pressure and had a refractive index at 25° C. of 1.5416.

*Example III.—2-methylnaphthylmethyl 9,10-epoxystearate*

To a suspension of sodium oleate (39.0 grams, .128 mole) in 125 ml. of N,N-dimethylformamide, 28.5 grams (.150 mole) of 1-chloromethyl-2-methylnaphthalene was added and the mixture heated to between 135 and 145° C. for 8½ hours with vigorous agitation. The following reaction occurred:

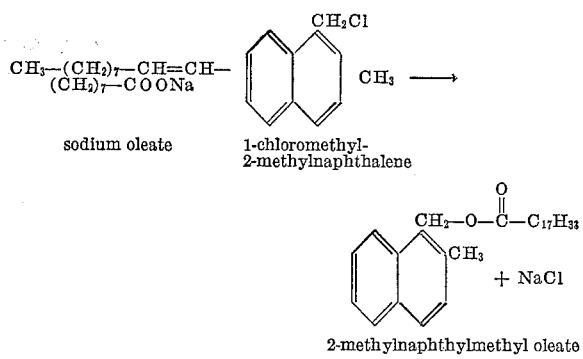

sodium oleate    1-chloromethyl-2-methylnaphthalene 2-methylnaphthylmethyl oleate The reaction mixture was vacuum-distilled, giving 41.5 grams (74% yield) of 2-methylnaphthylmethyl oleate.

The product distilled at 257 to 260° C. under 1.5 mm. Hg absolute pressure and had a refractive index of 1.5263 at 25.5° C. Its composition was: C, 82.2%; H, 10.2%. This compared to: C, 82.6%; H, 10.0%, calculated for $C_{30}H_{44}O_2$.

A solution of peracetic acid (9.5 grams, .125 mole) and sodium acetate (1.4 grams) in 14.1 grams of acetic acid was added dropwise to 50.0 grams (.114 mole) of 2-methylnaphthylmethyl oleate at 35° C. The following reaction occurred:

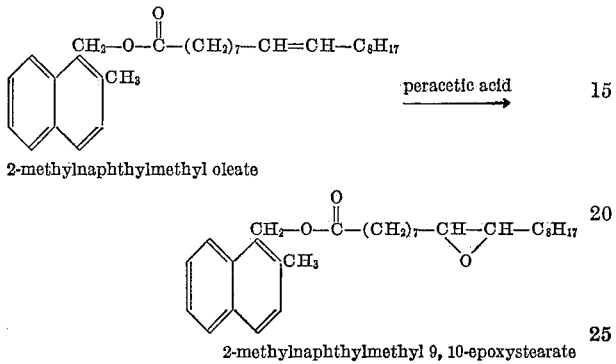

The reaction mixture was poured into water. The organic layer separated, was washed with sodium bicarbonate, and dried. The crude product, 2-methylnaphthylmethyl 9,10-epoxystearate amounted to 41.4 grams (85% yield). It contained 2.7% epoxyoxygen compared to 3.5% calculated for $C_{30}H_{44}O_3$.

*Example IV.—1-(2-oxapentenyl-4)-2-methylnaphthalene*

A solution of 17 grams (.42 mole) of sodium hydroxide in 200 ml. of allyl alcohol was treated with a slurry of 60 grams (.31 mole) of 1-chloromethyl-2-methylnaphthalene in 120 ml. of allyl alcohol. The resulting mixture was refluxed for 12 hours, filtered and distilled. The following reaction occurred:

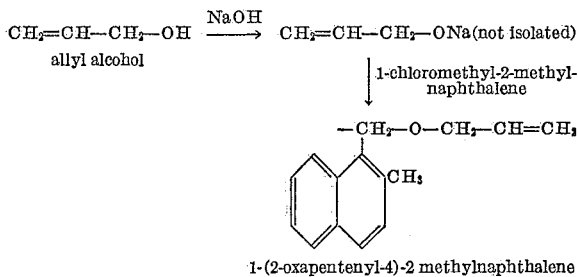

The product, 1-(2-oxapentenyl-4)-2-methylnaphthalene, distilled at 113 to 114° C. under .7 mm. Hg absolute pressure, had a refractive index of 1.5918 at 24.6° C., and amounted to 47.1 grams (72% yield). Its composition was: C, 85%; H, 7.6%. This compared to: C, 85.2%; H, 7.6% calculated for $C_{15}H_{16}O$.

*Example V.—1-(2-oxadodecyl)-2-methylnaphthalene (ODOMN)*

155 ml. of 1-decanol and 16.2 grams (.30 mole) of sodium methoxide were placed in a 500 ml. flask. The mixture was heated to 150° C. for two hours, and all of the methanol formed was removed. The solution was treated with 55 grams (.29 mole) of 1-chloromethyl-2-methylnaphthalene, heated for one hour at 165 to 170° C., cooled and filtered. The following reaction occurred:

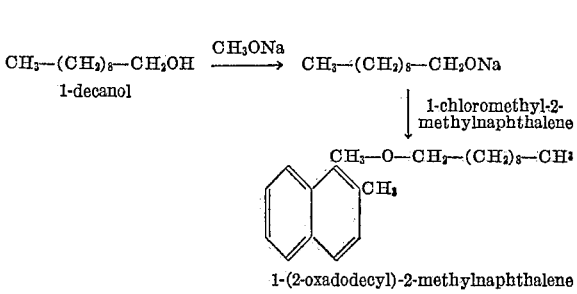

Distillation of the filtrate produced 61.1 grams (67.1%) of 1-(2-oxadodecyl)-2-methylnaphthalene boiling at 195 to 205° C. under 2.0 mm. Hg absolute pressure and having a refractive index of 1.5324 at 28.5° C. The product analyzed: C, 84.4%; H, 10.2% compared to C, 84.5%; H, 10.2%, calculated for $C_{22}H_{32}O$.

*Example VI.—1-(2-oxa-4-ethyloctyl)-2-methyl- naphthalene (OEOMN)*

Employing the identical procedure used in the preparation of 1-(2-oxadodecyl)-2-methylnaphthalene, 1-(2-oxa-4-ethyloctyl)-2-methylnaphthalene was obtained in a yield of 57%. The compound distilled at 175 to 180° C. under 3.0 mm. Hg absolute pressure and had a refractive index of 1.5458 at 19.7° C. It analyzed: C, 84.2%; H, 10%, compared to C, 83.9%; H, 10.5%, calculated for $C_{20}H_{30}O$.

*Example VII.—1 - (2,5,8-Trioxadodecyl)-2-Methylnaphthalene (TODMN)*

Sodium hydroxide (13.2 grams, 0.32 mole) was dissolved in 130 grams of diethylene glycol monobutyl ether, and the solution was treated with 60 grams (.31 mole) of 1-chloromethyl-2-methylnaphthalene. The mixture was kept at 120° C. for 4 hours, cooled and filtered. The following reaction occurred:

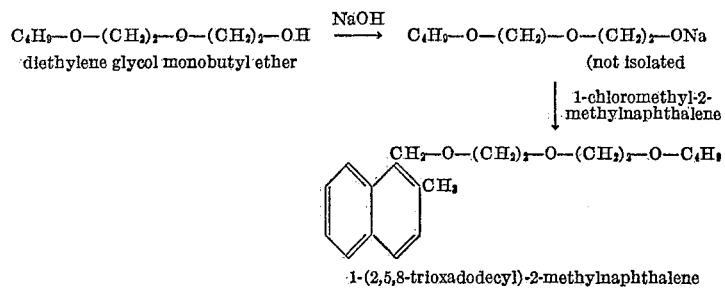

Distillation of the filtrate yielded 77 grams (77% yield) of 1 - (2,5,8-trioxadodecyl)-2-methylnaphthalene. The compound distilled at 191 to 198° C. under 1.5 mm. Hg absolute pressure and had a refractive index of 1.5422 at 25° C. It analyzed: C, 75.8%; H, 8.7%. This compared to C, 75.9%; H, 8.9%, calculated for $C_{20}H_{28}O_3$.

*Example VIII.—1-(2,5-Dioxanonyl)-2-Methylnaphthalene*

10.6 grams (0.27 mole) of sodium hydroxide and 82 grams of ethylene glycol monobutyl ether were placed in a 500 ml flask and the mixture heated and stirred until the sodium hydroxide dissolved. The solution was treated with 50 grams (0.27 mole) of 1-chloromethyl-2-methylnaphthalene in 300 ml. of ethylene glycol monobutyl ether, refluxed for 8 hours, cooled and filtered. The reaction was:

$$C_4H_9-O-(CH_2)_2-OH \xrightarrow{NaOH} C_4H_9-O-CH_2-CH_2-ONa$$

ethyleneglycol monobutyl ether

↓ 1-chloromethyl-2-methylnaphthalene

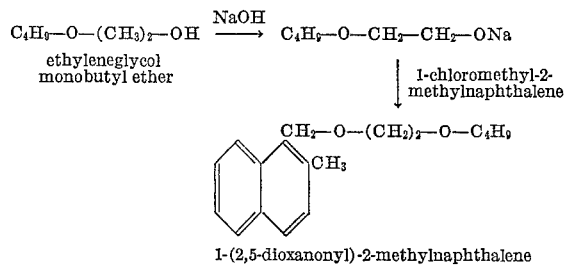

1-(2,5-dioxanonyl)-2-methylnaphthalene

Upon vacuum distillation, the filtrate yielded 54.6 grams (75% yield) of 1-(2,5-dioxanonyl)-2-methylnaphthalene. The product distilled at 149 to 155° C. under 1.0 mm. Hg absolute pressure and had a refractive index of 1.5509 at 25° C. It analyzed: C, 79.5%; H, 8.9%, compared to C, 79.4%; H, 8.9%, calculated for $C_{18}H_{24}O_2$.

*Example IX.—1-(7-Acetoxy-2,5-Dioxaheptyl)-2-Methylnaphthalene*

12.6 grams (.315 mole) of sodium hydroxide was dissolved in 120 grams of diethylene glycol. This solution was heated to 140° C. and treated with 1-chloromethyl-2-methylnaphthalene (60.0 grams, .314 mole). The resulting mixture was heated for 4 hours and filtered. The reaction was:

$$HO-(CH_2)_2-O-(CH_2)_2-OH \xrightarrow{NaOH} HO-(CH_2)_2-O-(CH_2)_2-ONa$$

diethylene glycol (not isolated)

↓ 1-chloromethyl-2-methylnaphthalene

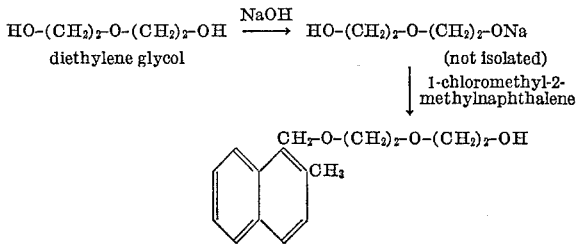

1-(7-hydroxy-2,5-dioxaheptyl)-2-methylnaphthalene

On fractionation of the filtrate, the product, 1-(7-hydroxy-2,5-dioxaheptyl)-2-methylnaphthalene, amounted to 61.5 grams (75% yield), distilled at 184 to 193° C. under 1.8 mm. Hg absolute pressure and had a refractive index of 1.5805 at 26° C.

The 7-hydroxy compound was treated with an excess of acetyl chloride to produce the desired 1-(7-acetoxy-2,5-dioxaheptyl)-2-methylnaphthalene in a yield of 66%. The ester distilled at 188 to 193° C. under 1.3 mm. Hg absolute pressure and had a refractive index of 1.5597 at 27° C. Its composition was: C, 72.2%; H, 7.7%, compared to C, 71.6%; H, 7.3%, calculated for $C_{18}H_{22}O_4$.

The methylnaphthalene derivatives produced as explained above may be used as plasticizers by incorporating them in resins such as polyvinyl chloride and polyvinyl chloride-acetate, in amounts from 10 to 120 parts per 100 parts of resin by weight. About 40 parts plasticizer per 100 parts resin by weight appears to give the best results.

The results of tests of resins plasticized with my compounds indicate that the latter give elastomers which are superior in strength and have less plasticizer migration than dioctyl phthalate. At low cure temperatures, e.g., 300° F., the elastomers produced with my novel plasticizers are significantly superior in tensile strength, tear resistance and elongation. Low cure temperatures are, of course, very desirable in many applications.

It will be evident that the plasticizers of my invention may be readily produced from inexpensive starting materials and thus materially supplement the compounds now being used as resin plasticizers.

Although I have disclosed herein the preferred practice of my invention, I intend to cover as well any change or modification therein which may be made without departing from the spirit and scope of the invention.

I claim:

1. The compound 2-methylnaphthylmethyl-9,10-epoxystearate.
2. The compound 1-(2,5,8-trioxadodecyl)-2-methylnaphthalene.
3. The compound 1-(2,5-dioxanonyl)-2-methylnaphthalene.
4. The compound 1-(7-acetoxy-2,5-dioxaheptyl)-2-methylnaphthalene.

References Cited in the file of this patent

UNITED STATES PATENTS

| 2,411,428 | Hechenbleikner | Nov. 19, 1946 |
| 2,459,526 | Hechenbleikner | Jan. 18, 1949 |
| 2,591,604 | Reck | Apr. 1, 1952 |
| 2,722,555 | Amidon | Nov. 1, 1955 |
| 2,799,699 | Smith | July 16, 1957 |
| 2,891,922 | Johnson | June 23, 1959 |
| 2,898,319 | Petropoulos | Aug. 4, 1959 |
| 2,925,426 | Schroeder | Feb. 16, 1960 |

FOREIGN PATENTS

| 516,280 | Germany | Jan. 21, 1931 |
| 810,199 | Germany | Aug. 6, 1951 |

OTHER REFERENCES

Hackh's Chemical Dictionary, 2nd ed., page 21 (1937).
Balfe et al.: Journ. Chem. Soc., pages 797–803 (1946).
Arnold et al.; J.A.C.S., vol. 69, page 2324 (1947).
Kruyt et al.: Chem. Abs., vol. 45, page 7287 (1951).
Lapkin et al.: Chem. Abs., vol. 45, page 7081 (1951).
Edwards: J. Agr. South Australia, vol. 56, pages 131–2 (October 1952).
Chakravarti et al.: Journal Indian Chemical Society, vol. 30, pages 750–4 (1953).

UNITED STATES PATENT OFFICE
CERTIFICATE OF CORRECTION

Patent No. 3,048,600

August 7, 1962

John J. Jaruzelski

It is hereby certified that error appears in the above numbered patent requiring correction and that the said Letters Patent should read as corrected below.

Column 4, line 21, the legend at the top of the benzene ring should appear as shown below instead of as in the patent:

$$CH_2-O-CH_2-(CH_2)_8-CH_3$$

column 5, line 16, the legend at the beginning of the reaction should appear as shown below instead of as in the patent:

$$C_4H_9-O-(CH_2)_2-OH$$

Signed and sealed this 13th day of November 1962.

(SEAL)
Attest:
ERNEST W. SWIDER
Attesting Officer

DAVID L. LADD
Commissioner of Patents